(12) United States Patent
Weiss

(10) Patent No.: US 8,713,124 B1
(45) Date of Patent: Apr. 29, 2014

(54) HIGHLY SPECIALIZED APPLICATION PROTOCOL FOR EMAIL AND SMS AND MESSAGE NOTIFICATION HANDLING AND DISPLAY

(75) Inventor: Adam Weiss, New York, NY (US)

(73) Assignee: Message Protocols LLC, New York, NY (US)

( * ) Notice: Subject to any disclaimer, the term of this patent is extended or adjusted under 35 U.S.C. 154(b) by 924 days.

(21) Appl. No.: 12/553,365

(22) Filed: Sep. 3, 2009

Related U.S. Application Data

(60) Provisional application No. 61/093,895, filed on Sep. 3, 2008.

(51) Int. Cl.
*G06Q 10/00* (2012.01)
*G06Q 10/10* (2012.01)

(52) U.S. Cl.
CPC .................................. *G06Q 10/107* (2013.01)
USPC ........................... 709/207; 709/205; 715/752

(58) Field of Classification Search
CPC ................. G06Q 10/107; G06Q 10/10; G06F 17/30011; G06F 17/30035
See application file for complete search history.

(56) References Cited

U.S. PATENT DOCUMENTS

| | | | |
|---|---|---|---|
| 5,377,354 A | 12/1994 | Scannelli et al. | |
| 5,694,616 A | 12/1997 | Johnson et al. | |
| 5,923,848 A * | 7/1999 | Goodhand et al. | 709/219 |
| 6,226,670 B1 | 5/2001 | Ueno et al. | |
| 6,351,764 B1 | 2/2002 | Voticky et al. | |
| 6,731,625 B1 * | 5/2004 | Eastep et al. | 370/352 |
| 6,871,217 B2 | 3/2005 | Voticky et al. | |
| 7,162,515 B2 | 1/2007 | Engstrom | |
| 7,206,814 B2 | 4/2007 | Kirsch | |
| 7,366,761 B2 | 4/2008 | Murray et al. | |
| 7,493,567 B2 | 2/2009 | Ollis et al. | |
| 7,512,652 B1 | 3/2009 | Appelman et al. | |
| 7,769,144 B2 * | 8/2010 | Yao et al. | 379/88.13 |
| 7,991,424 B2 * | 8/2011 | Batni et al. | 455/550.1 |
| 8,238,526 B1 * | 8/2012 | Seth et al. | 379/88.11 |
| 8,239,874 B2 * | 8/2012 | Anderson et al. | 719/314 |
| 8,364,181 B2 * | 1/2013 | Backholm et al. | 455/466 |
| 2002/0167538 A1 | 11/2002 | Bhetanabhotta | |
| 2003/0154293 A1 * | 8/2003 | Zmolek | 709/228 |
| 2003/0233419 A1 | 12/2003 | Beringer | |
| 2004/0039630 A1 * | 2/2004 | Begole et al. | 705/11 |
| 2004/0056901 A1 | 3/2004 | March et al. | |
| 2004/0111478 A1 * | 6/2004 | Gross et al. | 709/206 |
| 2005/0138552 A1 * | 6/2005 | Venolia | 715/526 |
| 2005/0198159 A1 | 9/2005 | Kirsch | |

(Continued)

OTHER PUBLICATIONS

Revised tree sort Author: Massoud Hakami Electric Power Research Center, Tehran, Iran • Proceeding of CSC '86 Proceedings of the 1986 ACM fourteenth annual conference on Computer science.*

(Continued)

*Primary Examiner* — Polina Peach
(74) *Attorney, Agent, or Firm* — McGuireWoods, LLP

(57) ABSTRACT

A method and system for handling and displaying incoming electronic messages in a user device. The method includes receiving a request to view a contact list on the user device, querying a priority table including a plurality of contacts, receiving a request to tag at least one contact in the plurality of contacts, tagging the at least one contact, and persistently displaying a received electronic message from the at least one contact at the top of a display.

13 Claims, 17 Drawing Sheets

(56) References Cited

U.S. PATENT DOCUMENTS

| | | |
|---|---|---|
| 2005/0267944 A1* | 12/2005 | Little, II .................. 709/207 |
| 2005/0273489 A1 | 12/2005 | Pecht |
| 2006/0230452 A1 | 10/2006 | Field |
| 2007/0030824 A1* | 2/2007 | Ribaudo et al. ............ 370/328 |
| 2007/0042710 A1* | 2/2007 | Mahini et al. ............ 455/3.03 |
| 2007/0061487 A1* | 3/2007 | Moore et al. .............. 709/246 |
| 2007/0233823 A1* | 10/2007 | Traub et al. ............... 709/220 |
| 2007/0282960 A1* | 12/2007 | Goldman et al. .......... 709/206 |
| 2008/0086695 A1 | 4/2008 | Oral |
| 2008/0126951 A1 | 5/2008 | Sood et al. |
| 2008/0147818 A1* | 6/2008 | Sabo ........................ 709/206 |
| 2009/0228555 A1* | 9/2009 | Joviak et al. .............. 709/205 |
| 2010/0332559 A1* | 12/2010 | Fry ........................... 707/805 |

OTHER PUBLICATIONS

Jeff Centimano "Voice Mail in Your Inbox: Cisco Unity and Microsoft Exchange Make It Happen" http://technet.microsoft.com/en-us/magazine/2005.01.unityexchange.aspx 2005.*

* cited by examiner

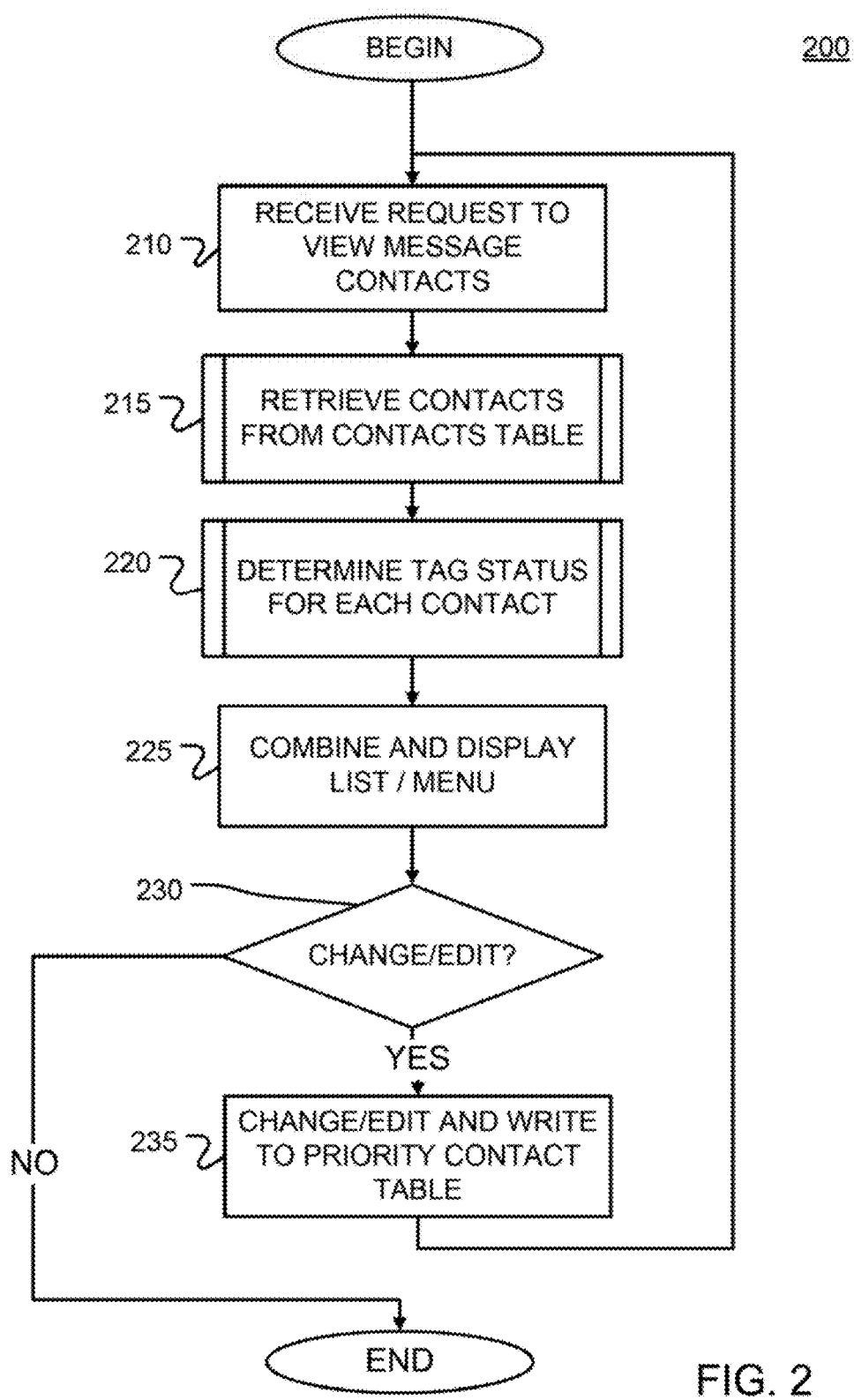

HIGHLY SPECIALIZED APPLICATION PROTOCOL FOR EMAIL AND SMS AND MESSAGE NOTIFICATION HANDLING AND DISPLAY

CROSS REFERENCE TO PRIOR APPLICATIONS

This application claims priority and the benefit thereof from a U.S. Provisional Application No. 61/093,895, filed on Sep. 3, 2008, which is hereby incorporated by reference for all purposes as if fully set forth herein.

BACKGROUND

1. Field

This disclosure relates to a method and a system for effectively and efficiently handling and displaying electronic information, including, for example, email messages, text messages, voicemail messages, or the like.

2. Related Art

Electronic communication has become ubiquitous and, in many instances, a preferred method of communication between individuals. As the popularity of electronic communication continues to grow, many individuals are experiencing information overload. The received information may include, for example, email messages, text messages, instant messages, video messages, and like. Many times, recipients do not view received information in time to respond, or they must vigilantly monitor incoming information in order to timely respond to time-sensitive information. Resultantly, large amounts of information are being overlooked or inefficiently processed by recipients.

The present disclosure provides a novel system and method for handling and displaying messages to ameliorate the growing information overload experienced by users generated by electronic communication, text communication and voicemail communication, while providing more effective and efficient communication.

SUMMARY OF THE INVENTION

The invention provides highly specialized sorting, handling and display of various electronic messages, including, e.g., text (e.g., SMS) messages, email messages, video messages, voicemail messages, and the like.

According to an aspect of the invention, a method is provided for handling and displaying incoming electronic messages in a user device. The method comprises: receiving a request to view a contact list on the user device; querying a priority table including a plurality of contacts; receiving a request to tag at least one contact in the plurality of contacts; tagging the at least one contact; and persistently displaying a received electronic message from the at least one contact at the top of a display.

The method may further comprise: creating a record for the at least one contact in the priority table, when it is determined that the at least one contact does not exist in the priority table; and populating the priority table with information for the at least one contact.

The method may further comprise: parsing the received electronic message to obtain sender information; querying the priority table to determine a tag status associated with the sender information; and sorting the received electronic message on the basis of the tag status.

The method may further comprise: displaying other received electronic messages beneath said received electronic message.

The method may further comprise: determining whether a tag status has changed for the at least one contact; and storing a new tag status in the priority table for the at least one contact when the tag status has been determined to have changed.

The method may further comprise: displaying a menu associated with each of the plurality of contacts; or displaying the received electronic message on the user device; or displaying the contact list on the user device, including a tag status for the at least one contact.

According to a further aspect of the invention, a system is provided for handling and displaying incoming electronic messages in the user device. The system comprises: a database connector configured to query a contacts database; a priority database connector configured to query a priority database; and a library function module, wherein the library function module is configured to: receive a request to view a contact list on the user device; query the priority database to determine a tag status for each of a plurality of contacts; sort the incoming electronic messages on the basis of the tag status for each of the plurality of contacts; and persistently display a received electronic message from at least one contact at the top of a display.

The library function module may be configured to combine the plurality of contacts into a display list box. The library function module may be further configured to display a tag status for each of the plurality of contacts. The library function module may be further configured to determine whether a tag status has changed for at least one contact of the plurality of contacts; and store a new tag status when the tag status has been determined to have changed for the at least one contact. The library function module may be further configured to display a menu associated with each of the plurality of contacts. The library function module may be further configured to sort the incoming electronic messages on the basis of the tag status for each of the plurality of contacts. The library function module may be further configured to display the sorted incoming electronic messages on the user device. In the system, a most recently received electronic message from the at least one contact may be persistently displayed as a first message.

According to a still further aspect of the invention, a computer readable medium is provided for handling and displaying incoming electronic messages in the user device. The computer readable medium comprises a computer program, which, when executed on a user device, causes the user device to: receive a request to view a contact list on the user device; query a priority database to determine a tag status for each of a plurality of contacts; sort incoming electronic messages on a basis of the tag status for each of the plurality of contacts; and persistently display a received electronic message from at least one contact at the top of a display.

The computer program may further cause the user device to combine the plurality of contacts into a display list box; or display a tag status for each of the plurality of contacts. The computer program may further cause the user device to: determine whether a tag status has changed for the at least one contact; and store a new tag status for the at least one contact when the tag status has been determined to have changed.

Additional features, advantages, and embodiments of the invention may be set forth or apparent from consideration of the following detailed description and drawings. Moreover, it is to be understood that both the foregoing summary of the invention and the following detailed description and drawings are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced.

FIG. 2 shows an example of a process for interacting with contacts in the user device of FIG. 1A, according to an aspect of the invention;

FIGS. 9A to 9C show various examples of an inbox displayed on the user device of FIG. 1A, according to principles of the invention.

Figure 1B:
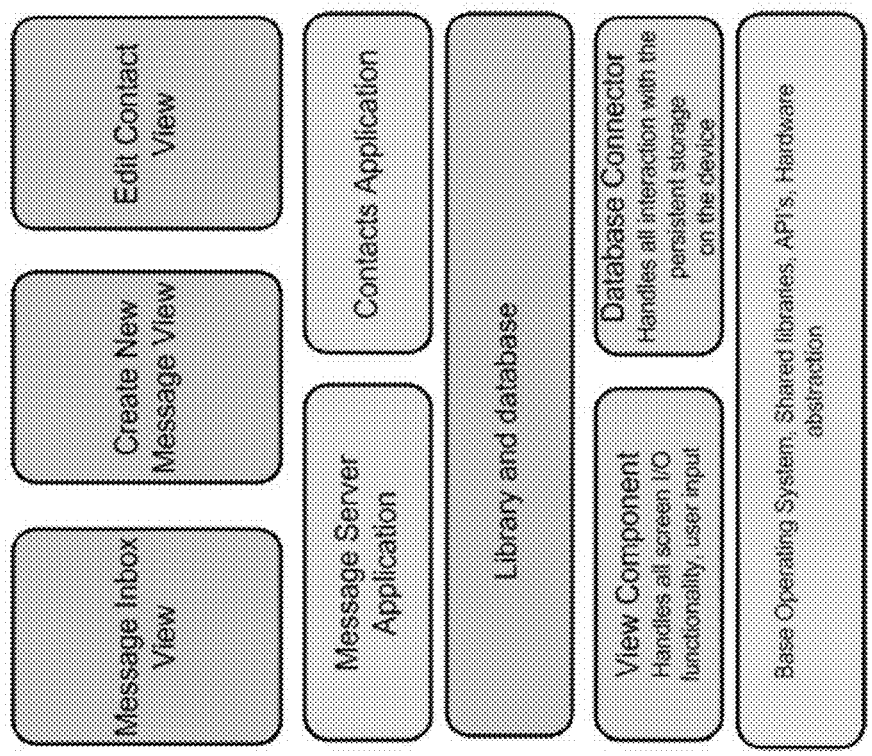
FIG. 1B shows an example of an abstract illustration of a library of the user device, shown in FIG. 1A, according to principles of the invention.

The present invention is further described in the detailed description below.

DETAILED DESCRIPTION OF THE INVENTION

The embodiments of the invention and the various features and advantageous details thereof are explained more fully with reference to the non-limiting embodiments and examples that are described and/or illustrated in the accompanying drawings, and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

According to an aspect of the invention, a system and a method are provided that enable specialized sorting and handling of various electronic messages, including, e.g., text (e.g., SMS) messages, email messages, video messages, voicemail messages, and the like, by adding functionality to both messaging and contacts applications on user devices 100 (UD), as well as to computer-based communication platforms. Users may tag specific messages (e.g., text/SMS, email, video, voicemail, or any combination thereof), so that these tagged messages will be displayed and maintained at the top (e.g., promoted to the top) of their inbox, regardless of incoming messages arriving afterwards, or before, thereby maximizing the visibility of the tagged messages. The invention may assure that a recipient will not lose sight of a message the recipient deems to be important (such as, e.g., an email from the boss, a text about an appointment, or a voicemail from a school nurse)—serving as a powerful reminder tool.

The system and method provide users with an ability to tag specific, favored, or important contacts in their contacts list(s), thereby automatically placing and keeping any messages received from these contacts at the top (e.g., promoted to the top) of their inbox, regardless of other incoming messages arriving afterwards, or before, from un-tagged senders. This may assure that messages that are received from contacts, which the user deems to be important (e.g., Doctors, important clients, their children, or the like), do not become buried or displaced from the screen by incoming messages of lesser importance.

Furthermore, the system and method provide users with an ability to tag or provide specific, favored, or important keywords, in either the message body or the subject line, thereby automatically placing any received messages containing these keywords at the top (e.g., promoted to the top) of their inbox, regardless of other incoming messages arriving afterwards (or before) that do not contain the tagged keywords. This may assure that the messages received with the keywords, which the user deems to be important (e.g., "emergency," "urgent," a child's name, a spouse's name, or the like), do not become buried or displaced from the screen by later incoming messages (or previously received messages) of lesser importance.

The system and method may also provide users with an added stream of compensation. In particular, the system and method may provide users with compensation from commercial senders (such as, e.g., individuals, companies, advertisers, or the like) in exchange for agreeing to have their messages tagged and, because they are a priority contact, increasing the visibility of messages received from the commercial senders. The compensation may include, for example, money, airline miles, coupons, or the like.

According to principles of the invention, a user device (UD) 100, may include, for example, but is not limited to, any machine, device, circuit, component, or module, or any system of machines, devices, circuits, components, modules, or the like, which are capable of receiving and/or sending data, and which are further capable of manipulating data according to one or more instructions, such as, for example, without limitation, a processor, a microprocessor, a central processing unit, a general purpose computer, a personal computer, a laptop computer, a palmtop computer, a notebook computer, or the like, or an array of processors, microprocessors, central processing units, general purpose computers, personal computers, laptop computers, palmtop computers, notebook computers, or the like. For example, a mobile device may include, without limitation, a smart telephone, a cellular telephone device, a satellite telephone device, a cordless telephone, a software-defined-radio (SDR), a two-way radio, a personal data assistant (PDA), a game console, a game controller, or the like.

Figure 1A:
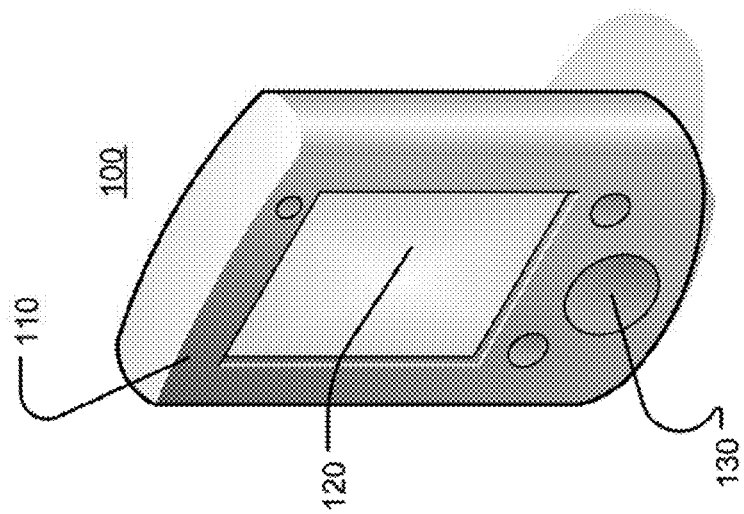
FIG. 1A shows an example of a user device, according to principles of the invention.

FIG. 1A shows an example of the UD 100, according to principles of the invention. As seen, the UD 100 may include a body 110, a display 120, and one or more actuators 130.

Original equipment manufacturer (OEM) messaging and contacts applications on the UD 100 may be provided with a plurality of computer readable and code sections (or segments) for carrying out the invention. For example, a plurality of computer readable code sections may be downloaded and installed into the OEM UD 100 prior to purchase, or downloaded and installed on the OEM UD 100 after purchase by a user. In the latter instance, the computer readable code sections may be downloaded from, e.g., the Internet, or directly from another device, such as, e.g., another user device.

Alternatively, a complete, stand-alone application may be provided that integrates features and user interface enhancements into messaging and contacts lists in the UD 100 via, e.g., standard API stacks.

Messaging and contacts applications may be added to existing user devices (e.g., UD 100) by adding functionality to both via, e.g., a shared library, or other mechanisms, if OEM restrictions prevent the use of a shared library. The shared library may be statically linked (e.g., binary) or incorporated via source code. Further, user interface extensions, including additional menu commands, and core functionality may be added to standard message handling applications and contacts applications on the user devices. The shared library may include persistent storage in the form of, e.g., a relational database, or it may share the same physical database, or it may be provided with its own database.

FIG. 1B shows an example of an abstract illustration of a library of the UD 100, according to the invention. As seen, the first layer includes the base operating system, shared libraries, API's, and hardware abstraction. The second layer includes the view component, which handles all screen input/output functionality and user input, and database connector, which handles all interaction with the persistent storage on the device. The third layer includes a library and a database. The fourth layer includes a message server application and a contacts application. The fifth layer includes a message inbox view, create a new message view and an edit contact view.

FIG. 2 shows an example of a process 200 for interacting with contacts in the UD 100, according to an aspect of the invention.

Figure 3:
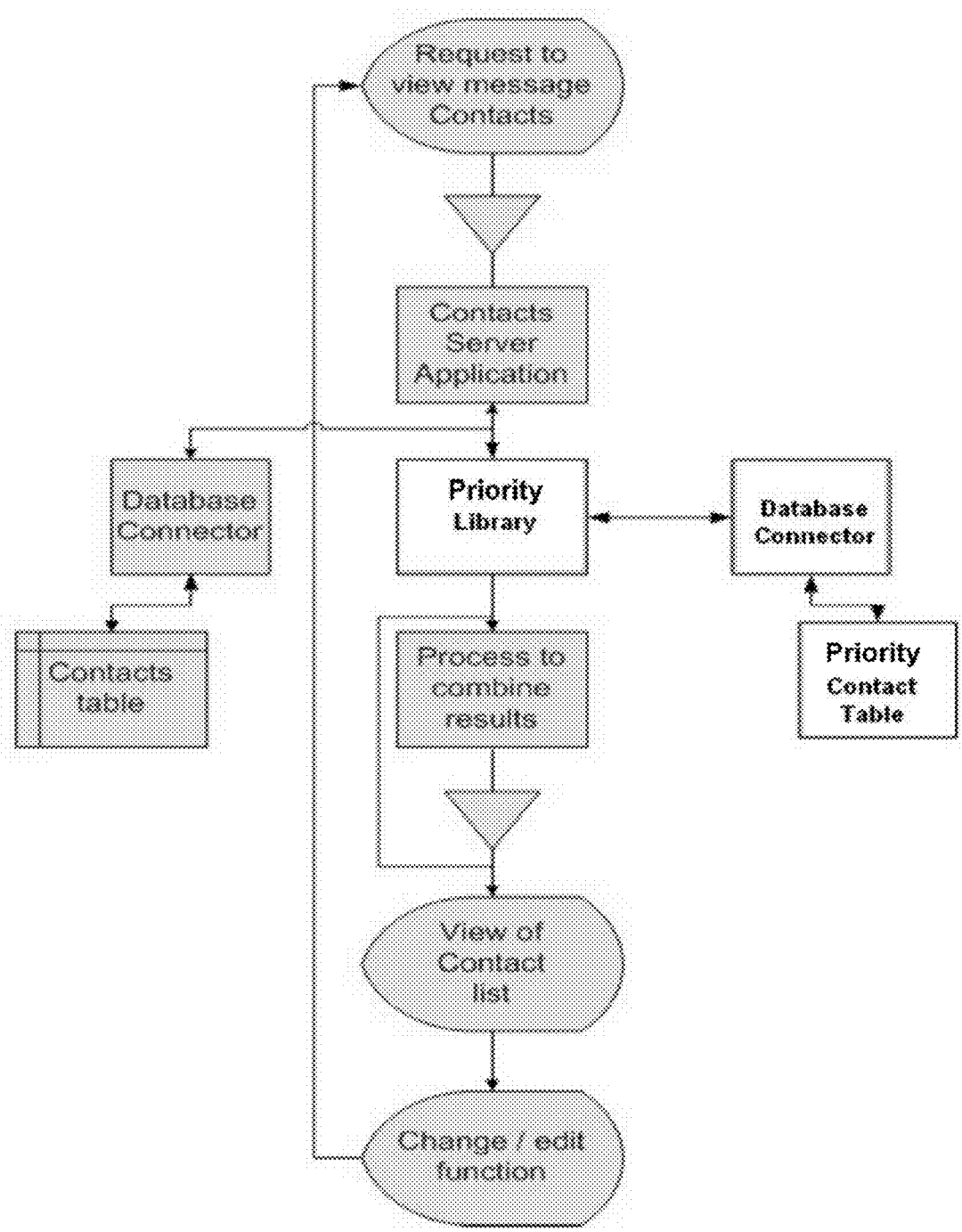
FIG. 3 shows a flow diagram of the process shown in FIG. 2.

FIG. 3 shows a flow diagram of the process 200, shown in FIG. 2.

Referring to FIGS. 2 and 3, initially, a request to view message contacts may be received from a user, e.g., via an input/output (I/O) interface on the UD 100 (Step 210). On the basis of the request, all contacts stored in a contacts table may be retrieved from, e.g., persistent storage (Step 215). The contacts may be retrieved by, for example, an operating system (OS) (e.g., in the UD 100) initiating a contacts server application, which through a database connector may query the contacts table to retrieve all of the contacts stored in the contacts table. A tag status may be determined for each returned contact (Step 220). The tag status may be determined by, e.g., calling a priority library function module (e.g., ::PriorityGetStatusContact( ), which may query a priority contact table through the database connector, returning a tag status value (e.g., PriorityStatus) for each contact. The determined tag statuses may then be combined and displayed as, e.g., a display list box on the display 120 (Step 225). The main contact view on the display 120, which may include an interactive user interface (e.g., a touch screen, or the like), may show the tag status for each contact listed (e.g., shown in FIG. 5B). Additionally, a new menu selection associated with each contact may be added and displayed on the display 120 (e.g., by the contact server application), which will allow the user to manipulate the tag status for each contact (Step 295). A determination may be made whether the user has changed the tag status of any of the contacts (Step 230). For example, the user may have requested that at least one contact in the contact list be tagged. Each time the tag (or priority) status is changed (YES, Step 230), the priority library function module (e.g., ::PriorityGetStatusContact( )) may be called, resulting in that new status for that contact being written to the priority contact table, which may be stored in a priority database (Step 235).

Figure 4A:
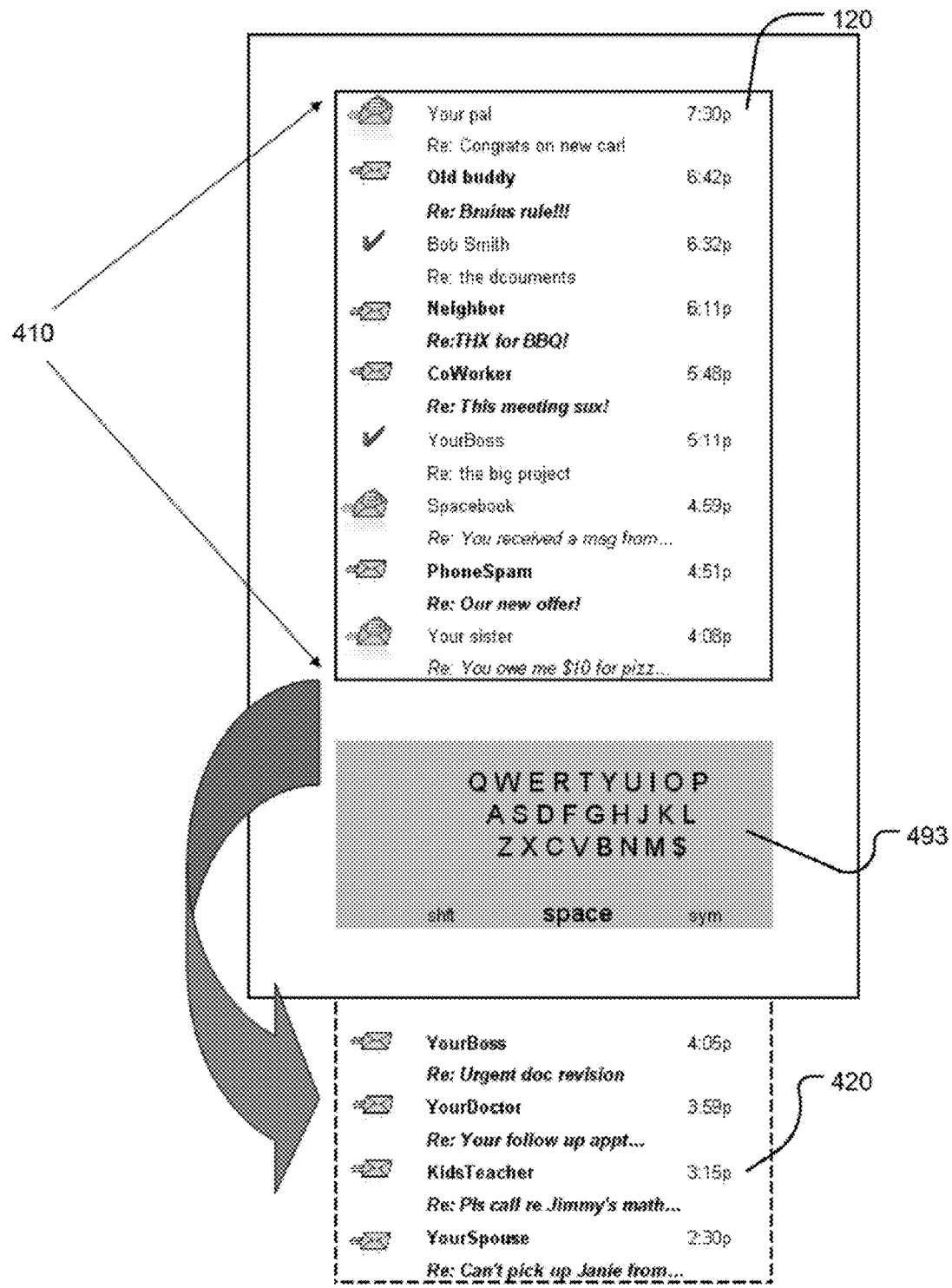
FIGS. 4A to 4I show various examples of display views on a display of the user device of FIG. 1A, according to principles of the invention.
Figure 4C:
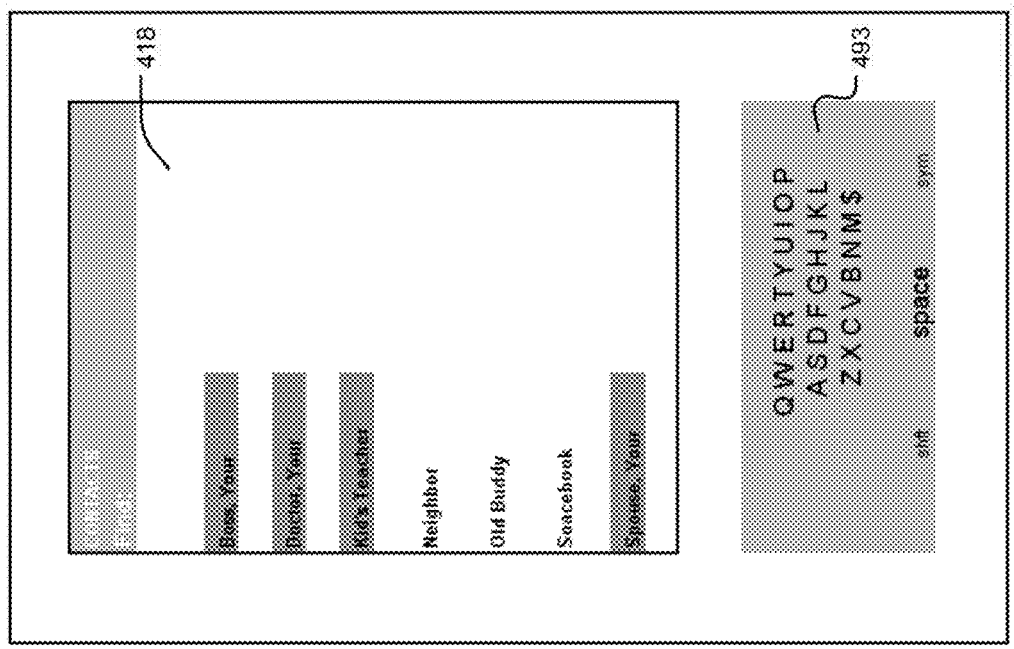
Figure 4B:
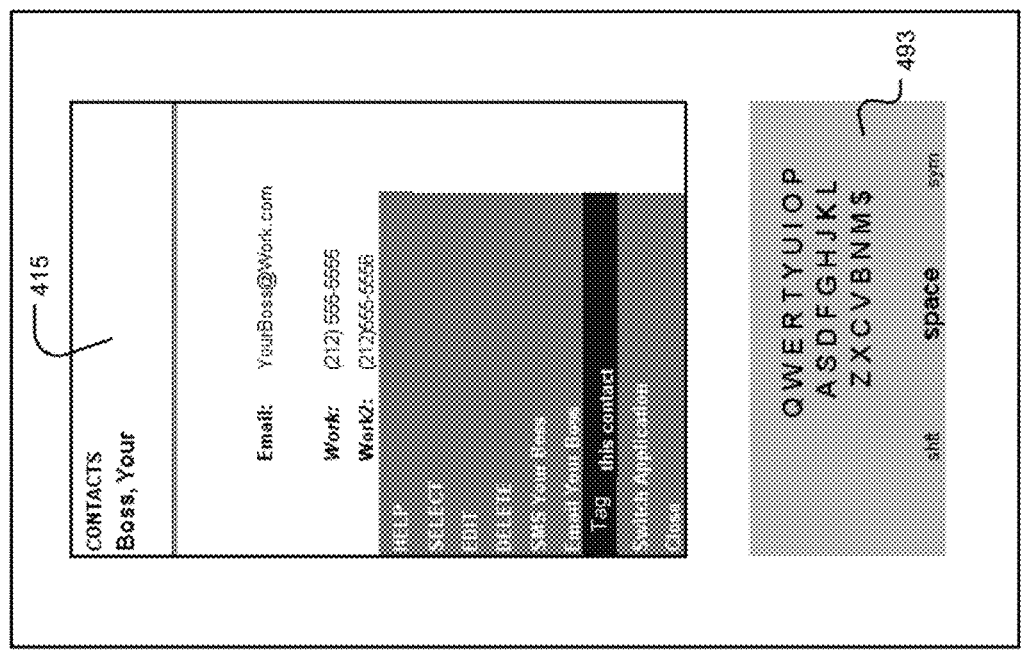
Figure 4D:
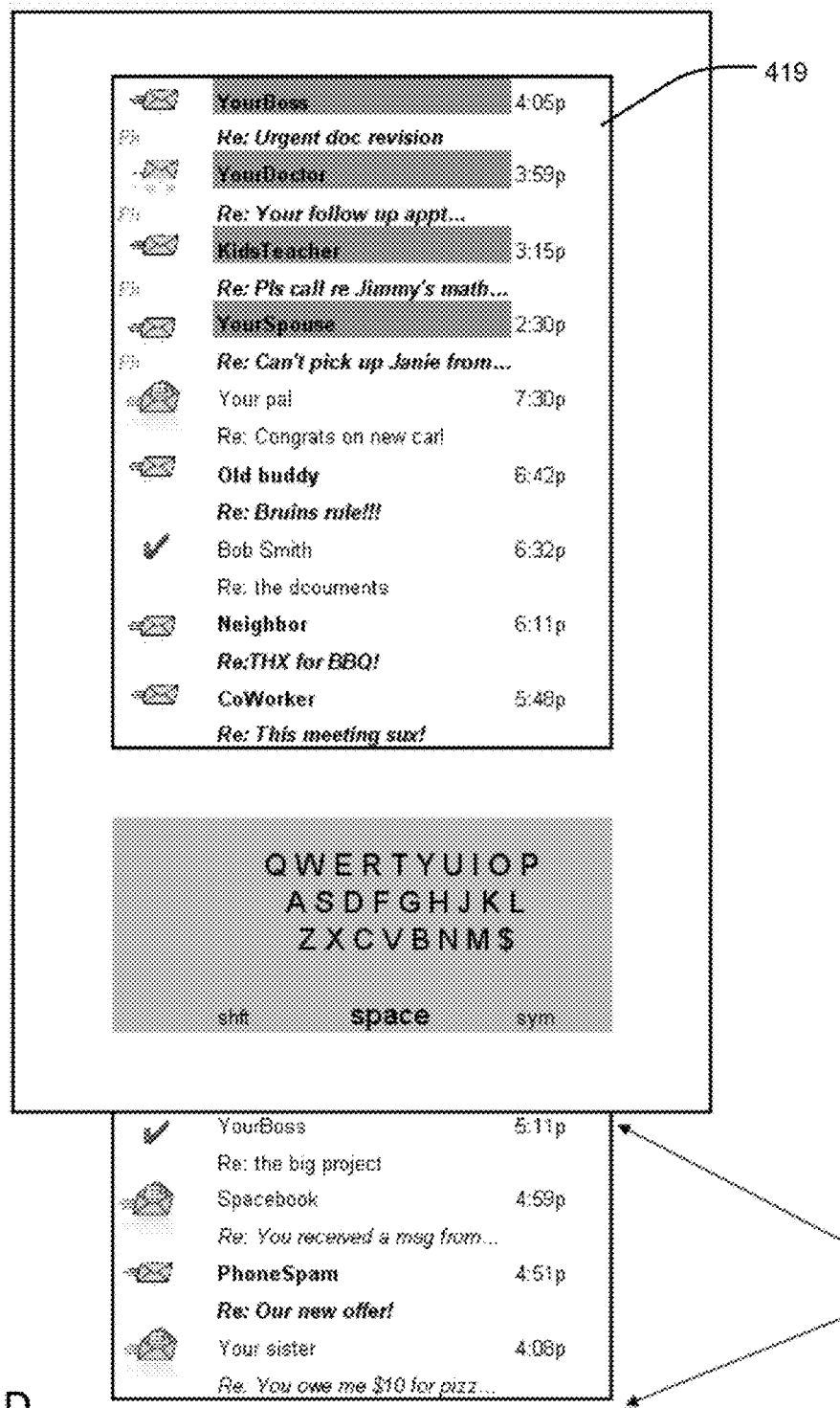
Figure 4E:
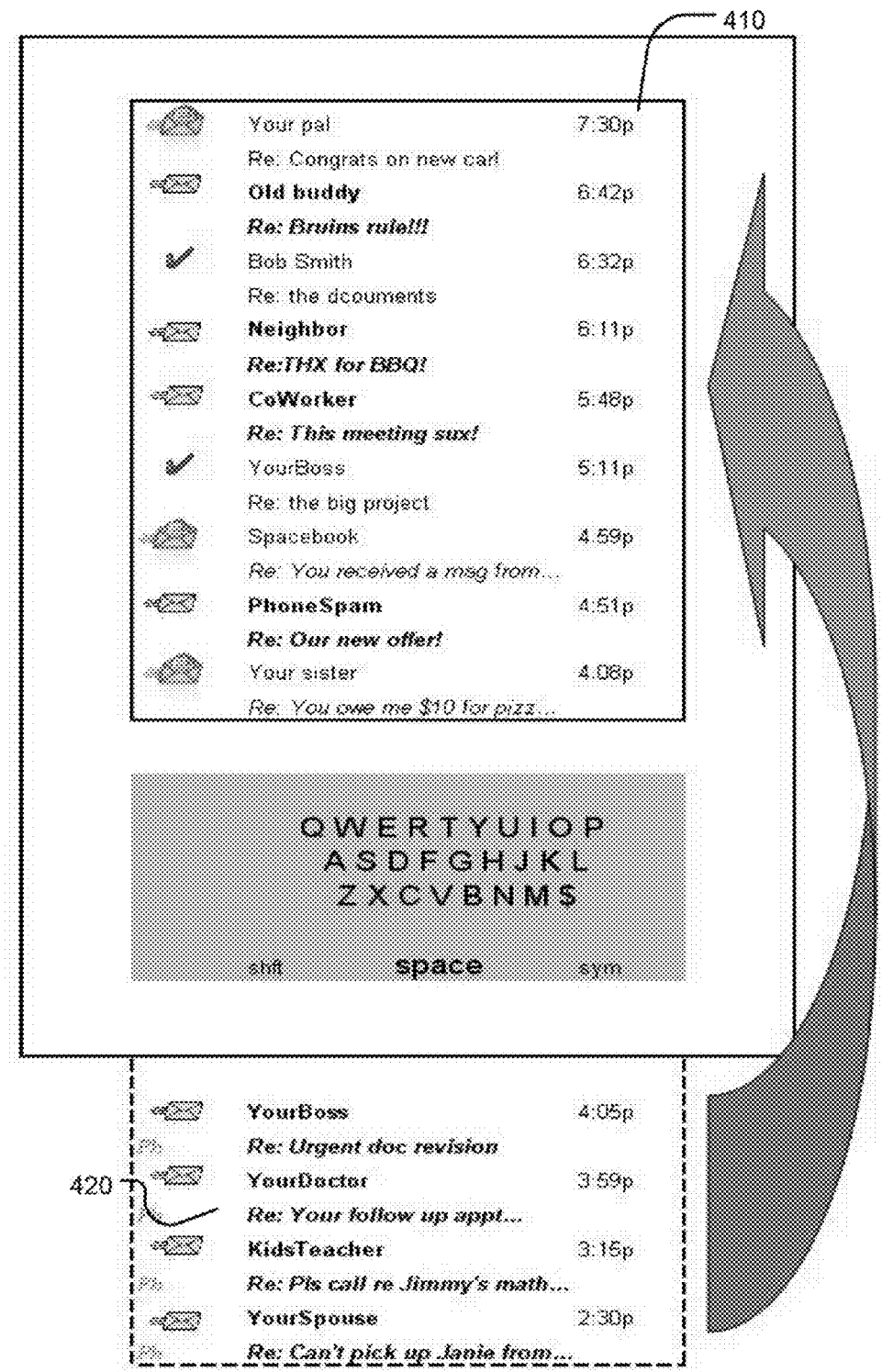
Figure 4F:
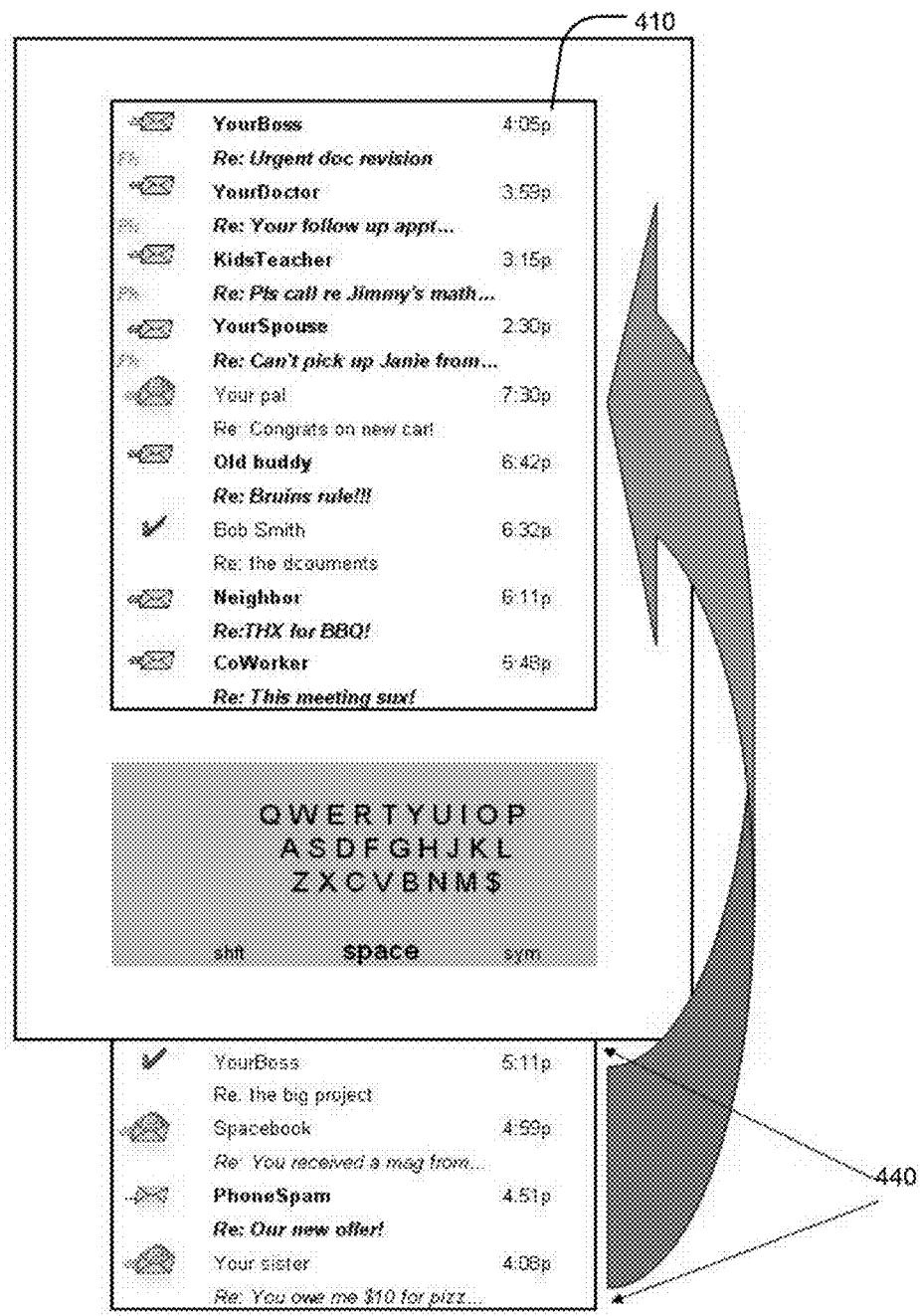
Figures 4G, 4H:
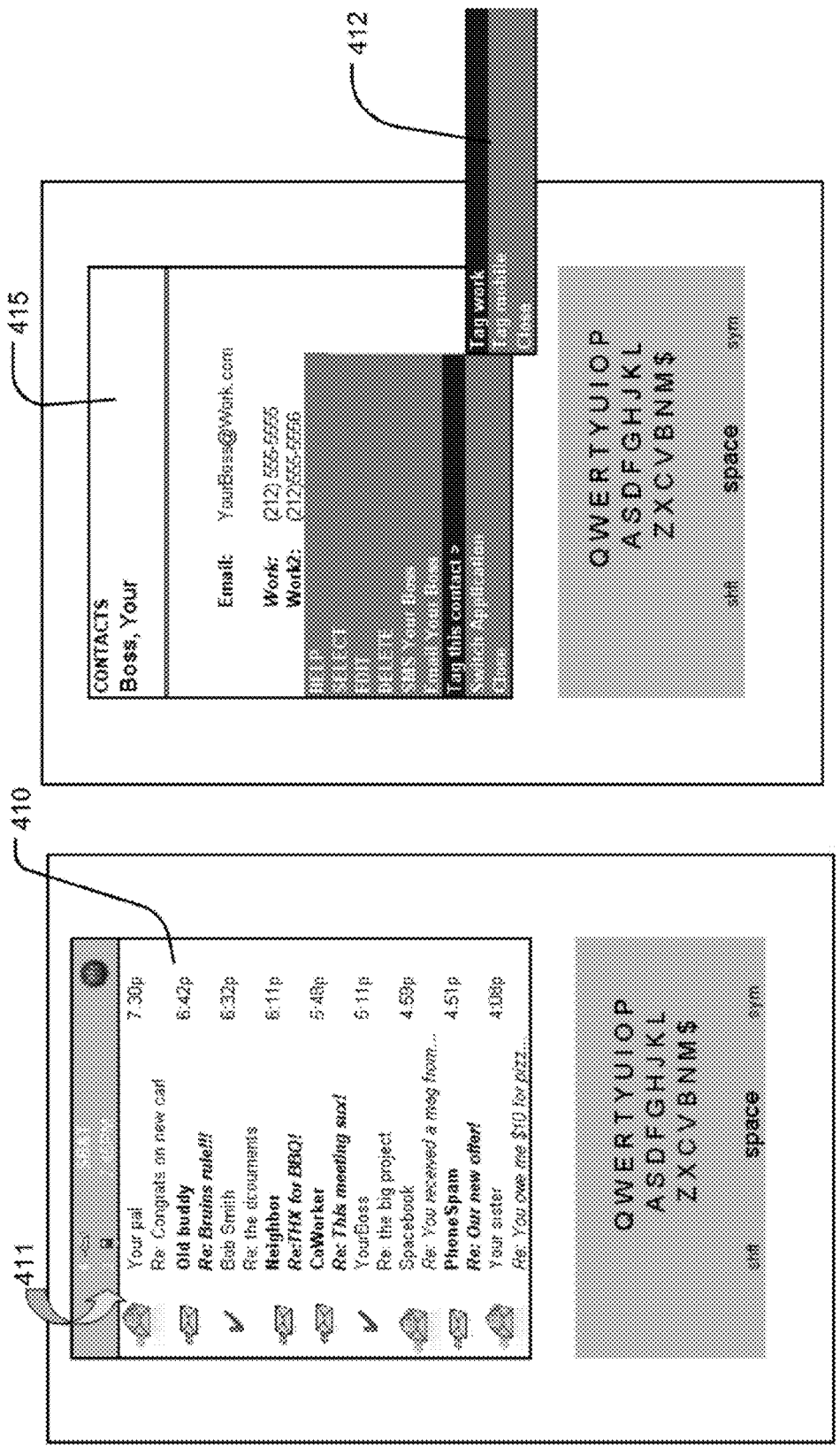
Figure 4I:
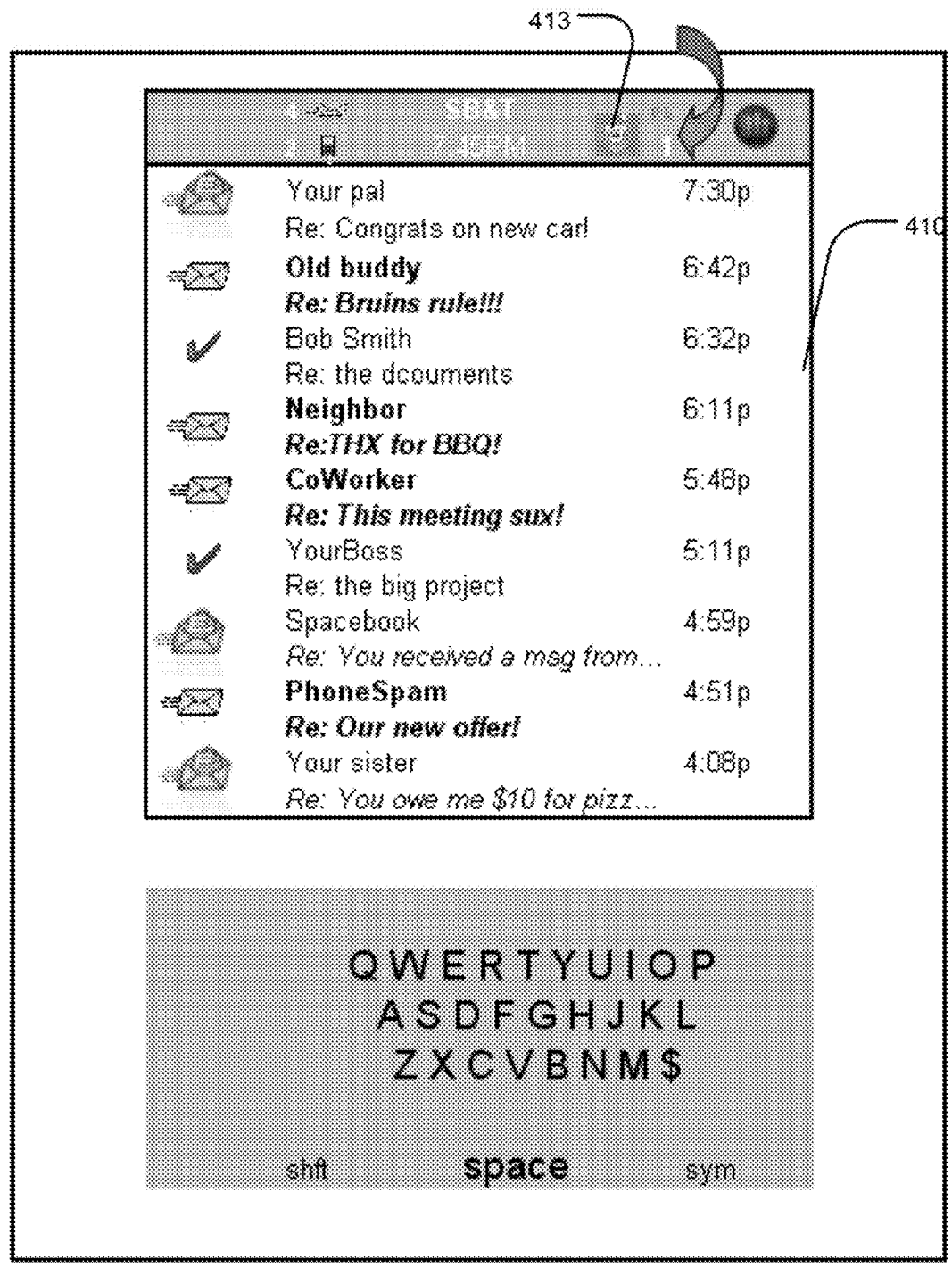

FIGS. 4A to 4I show various examples of display views 410 on the display 120 (shown in FIG. 1A). In particular, FIG. 4A shows an example of an untagged message list 410 displayed on the display 120, with the messages 420 being omitted from the display 120 (e.g., messages missed due to incoming messages). For example, the message list 410 may be what the user sees on the display 120 and the messages 420 may be what the user missed due to incoming messages pushing the messages 420 off the display 120. As seen in FIG. 4A, the UD 100 may include a user interface, such as, e.g., a keyboard 493. FIG. 4B shows an example of a contact 415 (e.g., "Boss, Your") displayed on the display 120 where the user may tag the contact 415, so that the user will not miss messages from this contact. FIG. 4C shows an example of a contact list 418 including a plurality of contacts, with the tagged contacts highlighted. FIG. 4D shows an example of an inbox view 419 with the messages from tagged contacts displayed at the top of the display screen of the display 120 and messages from non-tagged contacts positioned at the bottom 440 (e.g., a non-viewable) portion of the display screen. FIG. 4E shows an example of the messages 420 being tagged and moved to the top of the display screen 120, according to the principles of the invention. FIG. 4F shows an example of the tagged messages 420 in FIG. 4E being prioritized and displayed at the top of the display list 410, with certain of the messages 440 being removed from the display list 410 to make room for the tagged messages 420. FIG. 4C shows an example of the message list 410 displayed with a generic voicemail icon 411 on the display 120. FIG. 4H shows an example of the contact 415 displayed on the display 120 where the user may tag, e.g., a work or mobile telephone number of the contact 415, so that voicemail messages from this contact may be displayed with a special tag icon. FIG. 4I shows an example of the message list 410 displayed with a tag voicemail message icon 413 on the display 120, thereby allowing the user to see when a tagged contact has left a voicemail.

Figures 5A, 5B:
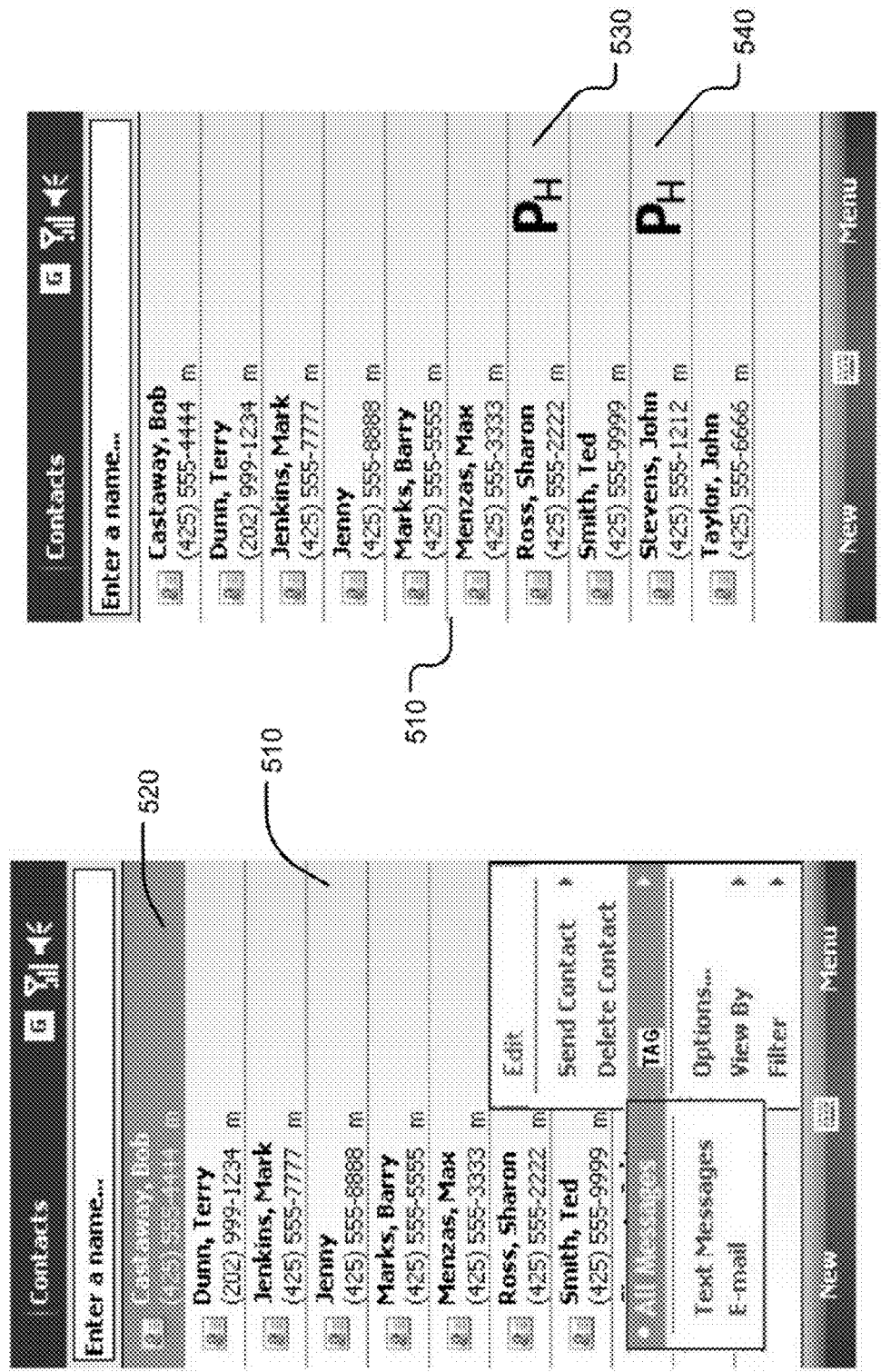
FIG. 5A shows an example of a contact list displayed on the user device of FIG. 1A.
FIG. 5B shows an example of the contact list of FIG. 5A, including two contacts that have been tagged, according to principles of the invention.

FIG. 5A shows an example of a contact list 510 on a UD 100 with a tag option, according to principles of the invention. In particular, the tag option may be selected from, e.g., a drop-down menu, for one or more of the contacts on the contact list 510. Once selected, a user may elect to tag all messages, only text messages, only emails, or only voicemails (not shown) for one or more contacts on the contact list 510. As seen, a user may enable or disable tagging for a contact 520 by, e.g., selecting the contact from a UD 100 contact list 510 and engaging the menu function. The onboard menu may display options to "Tag" or "un-Tag" the contact 520 (e.g., to set or unset the tag status).

For example, the user may select the contact 520, "Bob Castaway," which does not currently have any tag status selected. The user may then choose to set a tag status for All Messages, or for solely SMS/Text Messages, or for solely Email, or for solely Voicemail messages (not shown). In the example shown in FIG. 5A, the white dot may represent that the user has selected the tag option and enabled tagging for All Messages for the contact 520, "Bob Castaway." After this selection, all incoming messages from "Bob Castaway" will be tagged (or prioritized), which will cause all messages received from "Bob Castaway" to be displayed at the top (e.g., promoted to the top) of the recipient's screen in the inbox displayed on display 120, regardless of new message traffic coming in after (or before) the original messages are received. Further, messages received from multiple tagged contacts may be displayed at the top of the inbox in the order they were received—e.g., newest on top, but still ahead of all other non-tagged messages. The tagged messages may be separated visually from normal messages by a "space-bar" or some other visual aid.

FIG. 5B shows an example of the contact list 510 of FIG. 5A, including two contacts 530, 540 (e.g., "Ross, Sharon" and "Stevens, John") that have been tagged (e.g., "$P_H$"). All messages received from these two tagged contacts 530, 540 will automatically and continually be displayed at the top of the user's inbox and will be shown in the inbox with, e.g., a shaded/contrast background to distinguish the messages from regular messages. Alternatively, the tagged messages may be separated by, e.g., a space-bar, if contrasting is not possible on the UD 100.

It is noted that the display of tagged or prioritized messages is not limited to the top of the display 120 screen, but may be displayed in any region of the display 120 screen where a user may look to for prioritized messages, such as, e.g., but not limited to, the bottom of the display 120 screen.

Additionally, the tag option, which may be selected from, e.g., a drop-down menu, for one or more of the contacts on the contact list, may also include a voicemail message tag (e.g., as shown in FIG. 4H). Once selected, a special voicemail message icon/alert 413 (shown in FIG. 4I) may be displayed on the display 120. The special voicemail message icon/alert 413 may be displayed for voicemail messages left by tagged contacts even if a voicemail tag option is not provided, where the particular contact has been tagged. The voicemail message icon/alert 413 allows a user to, e.g., save time listening through voicemails and waiting to hear if any of the user's important contacts have called and left a voicemail. The voicemail message icon/alert 413 may be selectable by the user, where, if selected, an associated voicemail message may be played on the UD 100.

Figure 6:
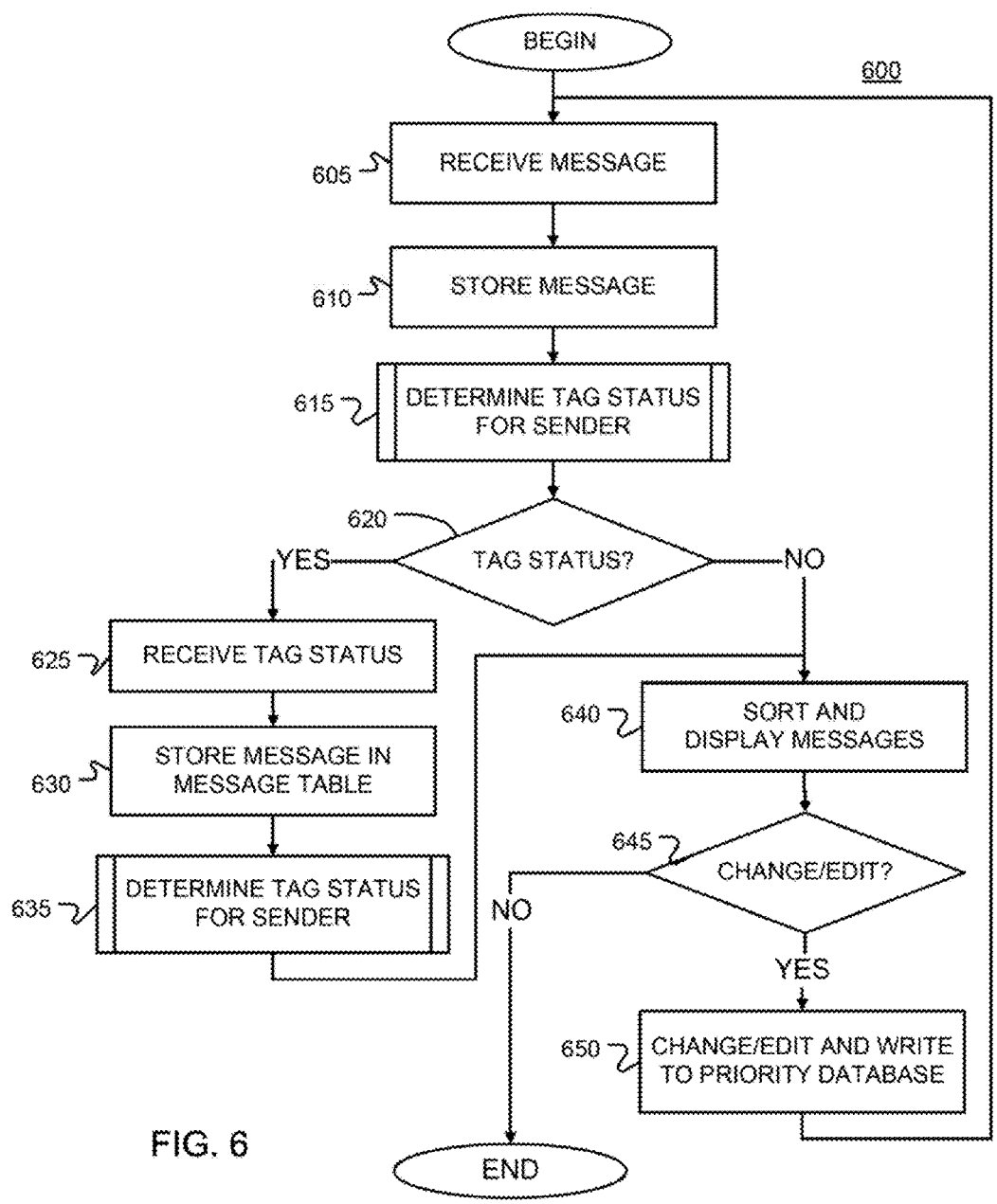
FIG. 6 shows an example of a process for interacting with messages in the user device of FIG. 1A, according to an aspect of the invention.

FIG. 6 shows an example of a process 600 for interacting with messages in the UD 100, according to an aspect of the invention.

Figure 7:
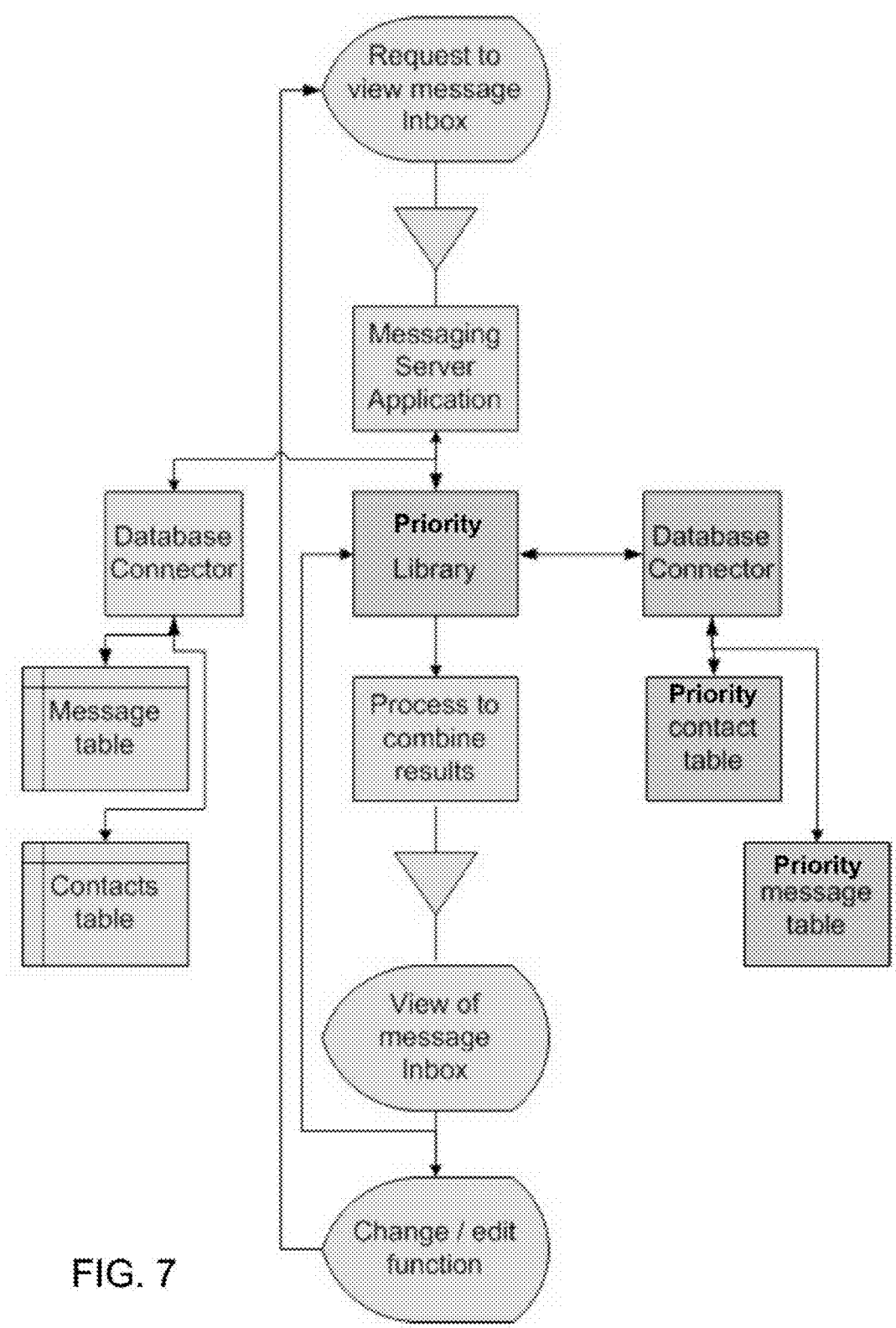
FIG. 7 shows a flow diagram of the process of FIG. 6.

FIG. 7 shows a flow diagram of the process 600, shown in FIG. 6.

Referring to FIGS. 6 and 7, after a new message is received by the UD 100 (Step 605), prior to any notification or alert being played to the user, the message server application may store the message in the persistent storage in a message table (Step 610). This message table may store the message as, e.g., raw message data, including, e.g., date and time received, sender information (e.g., telephone number, email address, MAC address, or the like), and message text/binary data. The sender information may be parsed from the message and compared with, e.g., a local contact database (if one exists). Additionally, text data may be analyzed from the message (e.g., from the subject line or message body) and compared with, e.g., a local list of tagged keywords.

A tag status may be determined for the message on the basis of the sender information by, e.g., calling the priority library function module (e.g., ::PriorityGetStatusContact( )), which compares the sender information against the records in the priority contacts table, which may be located in the priority database (Step 615). The priority database may include a complete listing of tagged records, including, e.g., a phone number, an email address, a MAC address, or the like, wherein the sender was on a prior occasion enabled for tagging. If the sender information is found in the priority database (YES, Step 620), then the current tag status associated with the message may be retrieved from the priority database (Step 625), otherwise the UD 100 may display the message as a normal message (e.g., an untagged message) (NO, Step 620, then Step 640). A null return may indicate that the sender has not been prior enabled for tagging. At this point, the message server application may save the message to its message table (Step 630), retrieve a new messageID, and then call a library function module (e.g., ::PrioritySetStatusMessage( )), forwarding the new messageID and the associated PriorityStatus for the contact (Step 635). The new message may then be displayed on the display 120, e.g., at the top of the inbox (Step 640).

Once the message is received (Step 605) and stored (Step 610), an alert or notification may be played to the user. Prompted by this notification, the user may load and view the entire message inbox. The inbox may be sorted by, e.g., the date and time the message was received, the subject line of the message, the sender information, and the like, in a predetermined order (e.g., descending order, alphabetical order, numerical order, or the like). In each of these cases, the tagged message may appear at the top of the inbox.

Prior to displaying the inbox list to the user (Step 640), the message server application may call the library function module (e.g., PriorityGetStatusMessage( )) for each message retrieved from the message table (inbox) (Step 635). This will return the PriorityStatus (or tag status) for each message. Then, another priority library function module may be called (e.g., ::PrioritySort( )), which may sort the messages into the predetermined order, so that messages having, e.g., a PriorityStatus=1 may appear above messages having, e.g., a PriorityStatus=0 (Step 640). Within a group of messages, all messages may be sorted by date and time received, e.g., in descending order. The resulting message list may then be displayed to the user (Step 640).

The UD 100 message server application may display a menu associated with each message (Step 640). The user may manipulate the tag status for each message. Each time the tag (or priority) status is changed (YES, Step 645), the priority library function module (e.g., ::PrioritySetStatusMessage( )) may be called, resulting in that new status for that message being written to the priority message table (Step 650). The user may also unset the tag status (un-Tag) for all messages in the inbox for a contact. This may be accomplished, e.g., by calling the priority library function module (e.g., ::PrioritySetStatusMessage) with no messageID variable.

Figure 8:
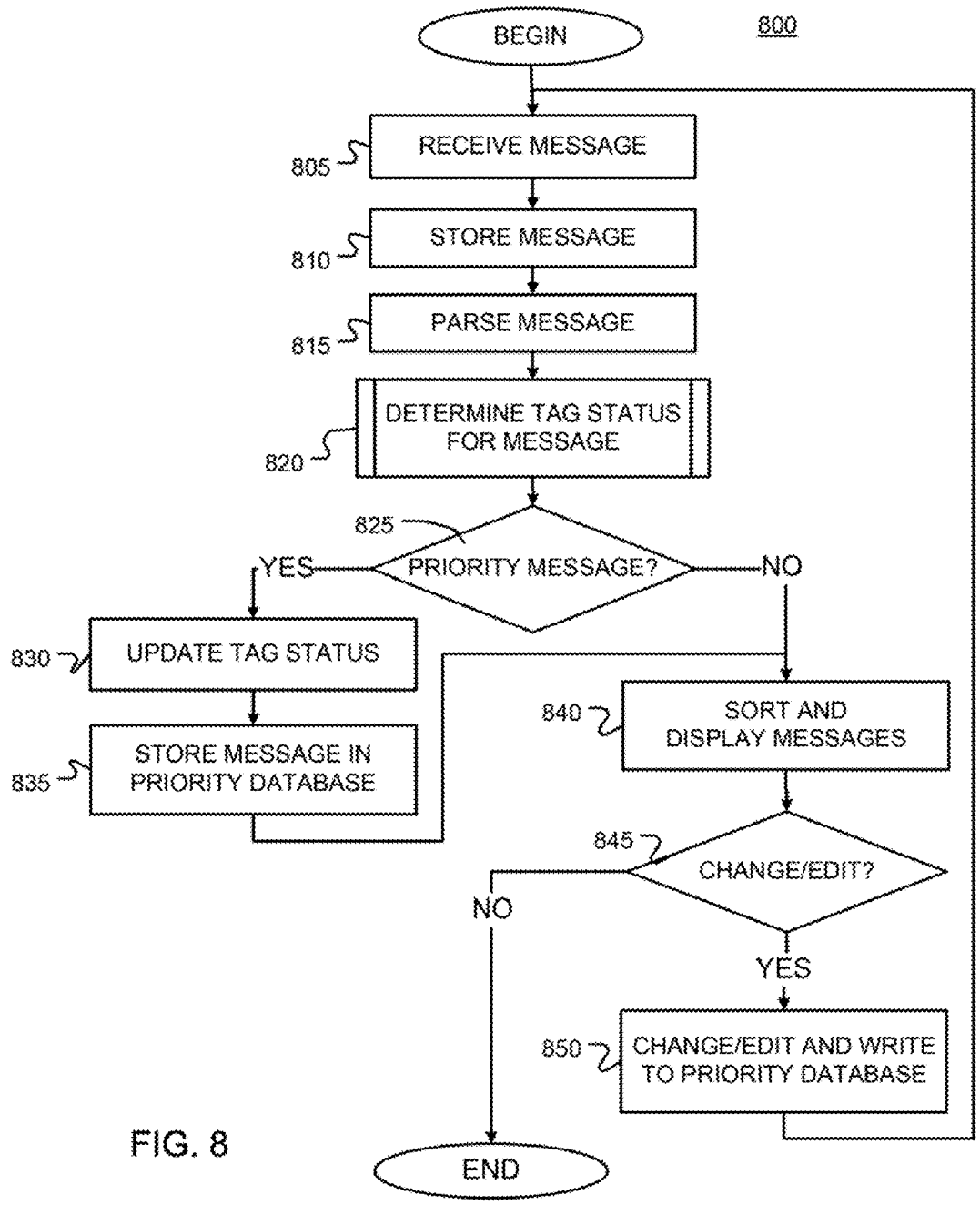
FIG. 8 shows an example of a further process for interacting with messages in the UD 100, according to a further aspect of the invention.

FIG. 8 shows an example of a process 800 for interacting with messages in the UD 100, according to a further aspect of the invention.

Referring to FIG. 8, keywords may be tagged or inputted in a local list of tagged keywords. Specifically, a new message may be received by the UD 100 (Step 805), prior to any notification or alert being played to the user, and the message server application may store the message in the storage in a message table (Step 810). Text data may be parsed from, e.g., the subject field or body of the message and compared with, e.g., a local list of tagged keywords (if one exists) (Step 815). A tag status may be determined for the message on the basis of the text data by comparing the text data against the local list of tagged keywords, which may be located in the priority database (Step 820). If any one or more tagged keywords appear in the text data (YES, Step 825), then the message may be tagged as a priority message and the tag status of the message updated in, e.g., the priority database (Step 830), otherwise the UD 100 may display the message as a normal message (NO, Step 840). At this point, the message server application may save the message to the priority database (Step 835). The new message may then be displayed on the display 120, e.g., at the top of the inbox (Step 840).

Once the message is received (Step 805) and stored (Step 810), an alert or notification may be played to the user. Prompted by this notification, the user may load and view the entire message inbox. The inbox may be sorted by, e.g., the date and time the message was received, the subject line of the message, the sender information, and the like, in a predetermined order (e.g., descending order, alphabetical order, numerical order, or the like). In each of these cases, the tagged message may appear at the top of the inbox.

A keyword may be tagged by, e.g., a user selecting an icon on the display 120 of the UD 100, then selecting a settings menu, and then entering or selecting a keyword, or by, e.g., selecting a particular word from the subject line or body of an open message. The user may be provided with an option to search, e.g., a subject field, a message body, or both for the tagged keyword.

Furthermore, messages may be tagged based on a domain name of the sender. For example, a user may select an icon for the settings menu on the display 120. The user may then enter or select one or more domain names for tagging. The tagged domain names may be stored in the priority database and later used to tag (or prioritize) received messages based on the tagged domain names. In this regard, the process 600 (shown in FIG. 6) may be used to receive a new message in the UD 100 and analyze the message to determine the sender information, including the domain name. The domain name may be compared with, e.g., a local list of tagged domain names. Messages that are sent from domain names matching one or more of the tagged domain names may be tagged and displayed at the top of the display screen. The messages may be tagged such that, e.g., future email messages sent from selected domain names (e.g., "@sampledomainname.com") will be displayed at the top of the display 120 inbox and will stay there, regardless of later (or previously) arriving messages.

Tagging may be carried out from the inbox of the UD 100 by, e.g., dealing with individual messages that have a tag status, dealing with individual messages that do not have a tag status, changing the tag status of a specific contact through the inbox/message received from that contact, or the like.

Figure 9A:
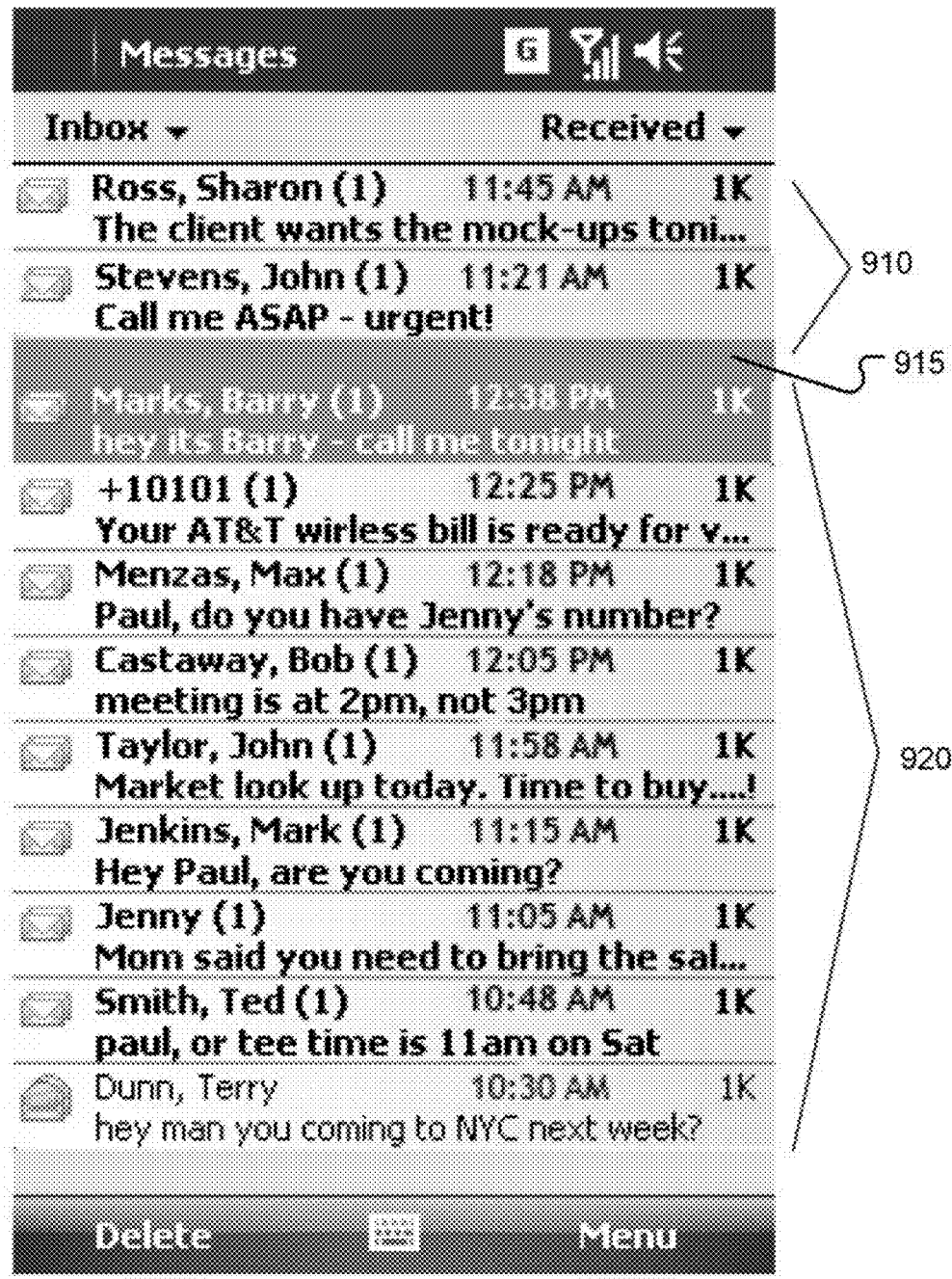

FIG. 9A shows an example of dealing with tagged messages, according to principles of the invention. In particular, FIG. 9A shows an example of a message inbox with two messages that have been received from tag-enabled contacts. In this case, the messages 910 from contacts "Sharon Ross" and "John Stevens" remain at the top of the inbox—and are differentiated by their shaded/contrast background 915. In cases where the inbox cannot show tagged messages with different color backgrounds, some other distinguishing feature may be included, such as, e.g., different text fonts, to highlight the tagged messages. As seen in the figure, the message received from "Barry Marks" at 12:38 PM (highlighted) is displayed below the tagged messages 910 from Sharon Ross and John Stevens—even though it was received after the messages 910. To further distinguish tagged messages from un-tagged messages, a line separator (or similar mechanism) may be inserted into the message list box, as seen in FIG. 9A. Multiple tagged messages 910 may be displayed in order of time received, with newest being displayed first or at the top.

Figures 9B, 9C:
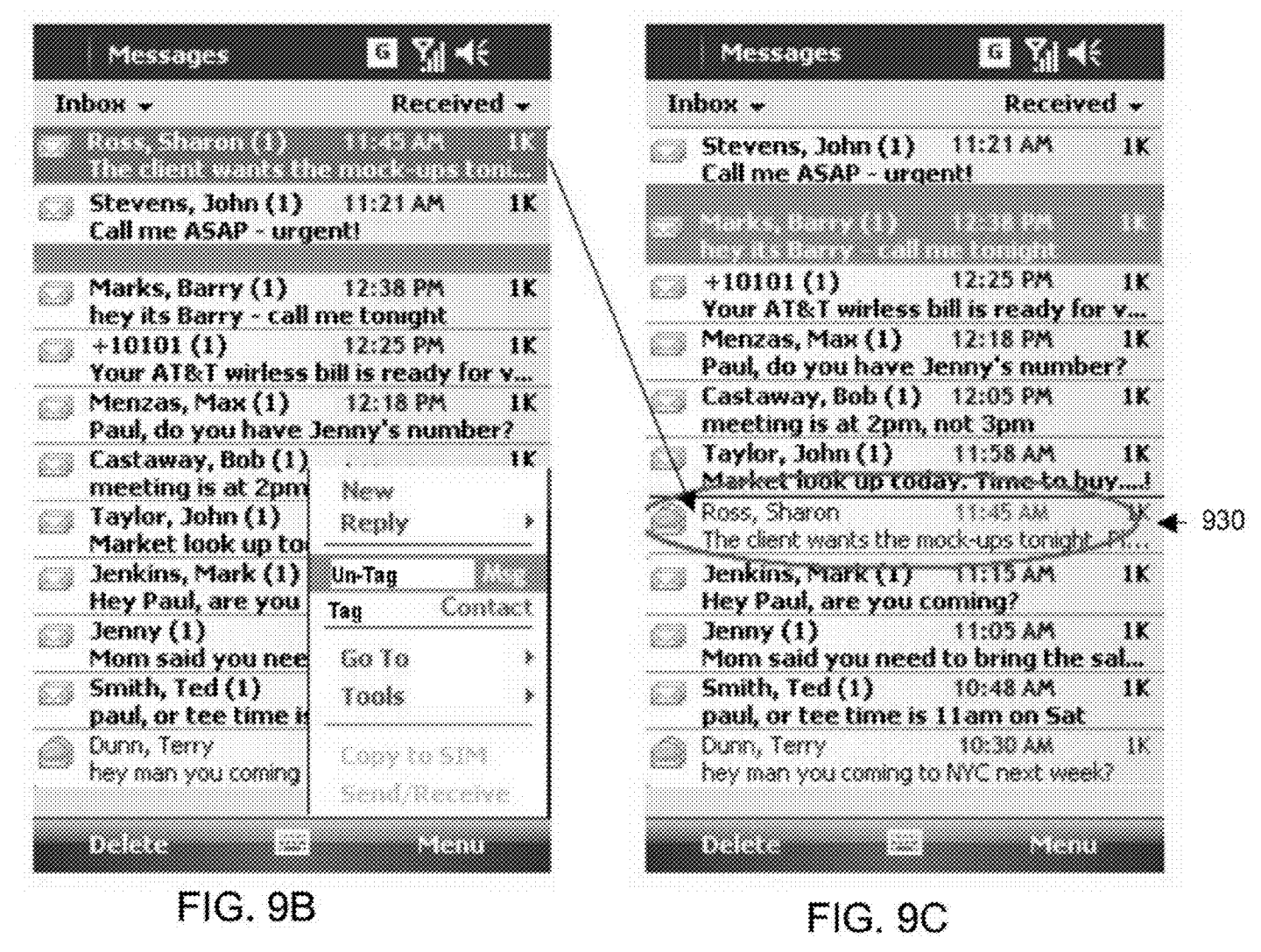

FIG. 9B shows an example of managing a tagged message, and FIG. 9C shows an example of an inbox after the message is un-tagged, according to principles of the invention.

Referring to FIGS. 9B and 9C, to manage an already tagged message 930 in the inbox, the user may select the tagged message 930 and then engage the menu. In the example shown, the message that is highlighted is from the contact "Sharon Ross," which was previously enabled for tagging and had its tag status set to "enabled" in the priority contacts table in the priority database. As this message is already tagged, the menu option to un-tag is available. To un-tag the message, the user may select this option, which may remove the message from the priority message database table and the message may then appear in the inbox, sorted normally by the original time it was received, as shown in FIG. 9C.

Figure 10:
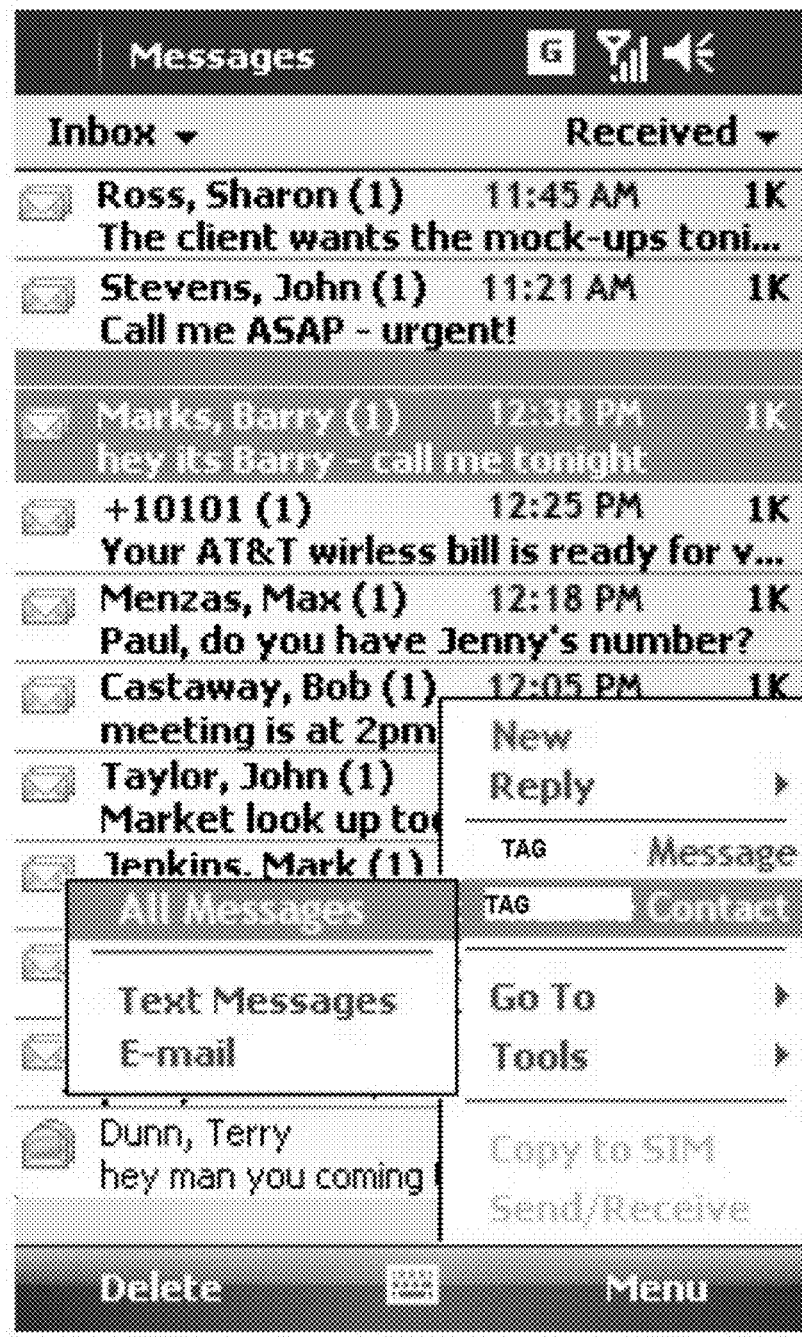
FIG. 10 shows an example of dealing with un-tagged messages, according to principles of the invention.

FIG. 10 shows an example of dealing with un-tagged messages, according to principles of the invention. In particular, FIG. 10 shows an example where the user may also tag any normal message traffic in the inbox by highlighting the message and selecting the tag message selection on the menu. This action may immediately promote the message from the general messages to the tagged message section at the top of the inbox. The message may now appear with a contrast highlighted background (e.g., if applicable on the UD 100). The message may remain tagged until deleted, or un-tagged, as the case may be. As mentioned above, all tagged traffic may be sorted by, e.g., time received, with the newest messages being displayed first.

If the user chooses, the user may tag all current and future messages from a particular contact through the message inbox. This may be accomplished by highlighting a particular message, and then selecting the tag contact menu item and then selecting either "All Messages," "Text Messages," or "E-mail." It is noted that the contact must already exist in the UD 100 contact list in order to be able to tag all traffic from the sender through the message inbox. Otherwise, the user may tag individual messages from a particular sender until the sender is added to the contact list. FIG. 10 shows an example where a user is adding a tag to the contact "Barry Marks" from within the message inbox.

The priority library function modules may be configured to integrate directly into the standard data store on the UD 100, or it may install its own database (e.g., SQLLite) on the UD 100. In situations where it may not be practical to integrate or install due to device memory or OEM restrictions or limitations, e.g., an XML file or simple text file may suffice to store the data necessary to enable the tagging functionality.

The priority library function module requires, e.g., two tables, including a contact table and a message table. The contact table (e.g., priority_contact) may include, e.g., five columns, including: a PriorityID (or tagID), which includes a long integer having a unique identifier; a contactID, which includes a long integer having a unique ID for a contact; a contactPhoneNumber, which includes a character string, having a unique phone number for a contact; a PriorityStatus (or tagStatus), which may include a 0 or a 1; and a lastupDateTime, which may include a date and time stamp for the last change made to the row. The message table may include, e.g., three columns, including: a messageID, which includes a long integer having a unique message identifier that may be created by the message server application; a contactID, which includes a long integer having a unique ID for a contact; and a PriorityStatus (or tagStatus), which may include an integer having a current PriorityStatus of either a 0 or a 1 for a message.

The priority library function module may be provided in any applicable programming language, including, but not limited to, e.g., Java, J2ME, C++, C#, C, Objective-C, or the like.

The following TABLE I includes non-limiting examples of library definitions.

TABLE I

Example of Library Definitions

PriorityStatus = 0 = "enabled"
PriorityStatus = 1 = "enabled"
The library function module may include six functions, including:
(1) ::PrioritySetStatusContact(contactID, PriorityStatus) returns ( );
(2) ::PriorityGetStatusContact(contactID) returns (PriorityStatus);
(3) ::PriorityGetStatusContact(phone_number) returns (contactID, PriorityStatus);
(4) ::PrioritySetStatusMessage((*optional) messageID, contactID, PriorityStatus);
(5) ::PriorityGetStatusMessage(messageID) returns (PriorityStatus); and
(6) ::PrioritySort(messageList) returns (messageList).
Method (1) will either create a new row or update an existing row in the priority_contact table.
Method (2) will return from the priority_contact table, the current PriorityStatus for a given
contact.
Method (3) will return from the priority_contact table, the contactID and current PriorityStatus
for the given phone number or email address. If neither the phone number nor the email
address exists in the priority_contact table, then Null's are returned.
Method (4) will update all rows in the priority_message table for the given contactiD and set
the tag status equal to the PriorityStatus (or tagStatus), if the messageID is not provided as
an input.
Method (5) will return the current PriorityStatus for a given message.
Method (6) will return a relevant data array pointer that contains a list of messages sorted by
date and time, descending (i.e., newest first). Each message in the array will also contain the
relevant PriorityStatus for that message.
The contactID is a unique integer value assigned to each contact entry in the main contact
table in the UD 100 persistent storage. This ID is assigned by the contacts application.
The phone_number is the phone number (for SMS) or email address (for email) associated
with the From field of a received message.
The messageID is the unique integer value assigned to each message entry in the main
messages table in the device persistent storage. This ID is assigned by the message server
application.
The messageList is a relevant data array pointer that contains a list of messages sorted by date
and time, descending (i.e., newest first). Each message in the array will also contain the
relevant PriorityStatus for that message.

It is noted that in cases where tagged messages cannot be moved to the top of the inbox, a bookmark, or hyper-link, may be displayed to the user on display 120 which may be time-stamped in such a way as to keep the tagged messages at the top of the inbox, and when clicked on, will display the original message. Further, in cases where tagged messages cannot be moved to the top of the inbox (e.g., owing to OEM limitations), a bookmark, or hyper-link, may be displayed to the user and may appear exactly as the original message, but the message may be time-stamped in such a way as to keep it at the top of the inbox, and when clicked on, may display the original message. Still further, in cases where tagged messages cannot be moved to the top of the inbox (e.g., owing to OEM time stamp or display limitation's), a bookmark, or hyper-link, may be created by the system, and may then be displayed to the user, appearing exactly as the original message, but the message may be time-stamped in such a way as to keep it at the top of the inbox, and when clicked on, may display the original message.

It is further noted that an audible alert (such as, e.g., a sound, a ring tone, or the like) may be associated with a tagged message (e.g., an email message, a text message, a video message, a voicemail message, or the like). In this regard, the audible alert may be reproduced, e.g., when a tagged message is received by the UD 100. The audible alert may be reproduced once after receipt of the tagged message; or the audible alert may be repeatedly reproduced at predetermined intervals after receipt of the tagged message, until the message is accessed and reviewed on the UD 100.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications or modifications of the invention.

What is claimed:

1. A method for positioning electronic messages in an electronic message inbox, comprising:
    a priority database connector configured to query a priority database; and
a library function module, wherein the library function module is configured to perform the following steps:
    storing contacts in a data source;
    receiving a first request to view a contact list, wherein the contact list includes at least a subset of the stored contacts;
    providing a list of contacts in response to the first request;
    receiving a second request to tag one or more contacts in the contact list;
    automatically tagging the one or more contacts in response to the second request by querying a contact table;
    receiving a plurality of electronic messages, wherein at least one of the plurality of electronic messages is from a sender associated with a stored contact that is associated with a tag, wherein at least one of the plurality of electronic messages is from a sender associated with a stored contact that is not associated with a tag, wherein at least one of the plurality of electronic messages is from a sender that is not associated with a stored contact; and,
    for each received message:
        parsing the received electronic message to obtain sender information;
        comparing the obtained sender information to one or more of the stored contacts;
        when the comparison identifies a contact that is associated with the obtained sender information:

determining whether the identified contact is associated with a tag;
when the identified contact is associated with a tag:
positioning and prioritizing the received message in the electronic message inbox such that the received message is displayed in the electronic message inbox with the stored associated tag, wherein the electronic message inbox displays the received message sequentially with any other received message having had an identified contact associated with a tag as one single group, wherein the message includes a voicemail message from the tagged contact, thereby allowing the user to see when the tagged contact has left a voicemail and playing the voicemail message when selected by the user;
when the identified contact is not associated with a tag:
positioning the received message in the electronic message inbox such that the received message is displayed below any electronic message received from a contact that is associated with a tag; and,
when the comparison does not identify a stored contact that is associated with the obtained sender information:
positioning the received message in the electronic message inbox such that the message is displayed below any electronic message received from a contact that is associated with a tag.

2. A system for handling incoming electronic messages in a user device, comprising:
a processor;
a database connector configured to query a contacts database;
a priority database connector configured to query a priority database; and
a library function module, wherein the library function module is configured to:
store contacts in a data source;
receive a first request to view a contact list, wherein the contact list includes at least a subset of the stored contacts;
provide a list of contacts in response to the first request;
receive a second request to tag one or more contacts in the contact list;
automatically tag the one or more contacts—in response to the second request by querying a contact table;
receive a plurality of electronic messages, wherein at least one of the plurality of electronic messages is from a sender associated with a stored contact that is associated with a tag, wherein at least one of the plurality of electronic messages is from a sender associated with a stored contact that is not associated with a tag, wherein at least one of the plurality of electronic messages is from a sender that is not associated with a stored contact; and,
for each received message:
parse the received electronic message to obtain sender information;
compare the obtained sender information to one or more of the stored contacts;
when the comparison identifies a contact that is associated with the obtained sender information:
determine whether the identified contact is associated with a tag;
when the identified contact is associated with a tag:
position and prioritize the received message in the electronic message inbox such that the received message is displayed in the electronic message inbox, wherein the electronic message inbox displays the received message sequentially with any other received message having had an identified contact associated with a tag as one single group, and wherein the message includes a voicemail message from the tagged contact, thereby allowing the user to see the tagged contact has left a voicemail;
when the identified contact is not associated with a tag:
position the received message in the electronic message inbox such that the received message is displayed below any electronic message received from a contact that is associated with a tag; and,
when the comparison does not identify a stored contact that is associated with the obtained sender information:
position the received message in the electronic message inbox such that the message is displayed below any electronic message received from a contact that is associated with a tag.

3. The system according to claim 2, wherein the library function module is further configured to combine the contacts into a display list box.

4. The system according to claim 2, wherein the library function module is further configured to display a tag status for each of the plurality of contacts.

5. The system according to claim 2, wherein the library function module is further configured to
determine whether a tag status has changed for at least one contact; and
store a new tag status when the tag status has been determined to have changed for the at least one contact.

6. The system according to claim 2, wherein the library function module is further configured to display a menu associated with each of the contacts.

7. The system according to claim 2, wherein the library function module is further configured to sort the incoming electronic messages on the basis of the tag status for each of the plurality of contacts.

8. The system according to claim 7, wherein the library function module is further configured to display the sorted incoming electronic messages on the user device.

9. The system according to claim 8, wherein a most recently received electronic message from the at least one contact is persistently displayed as a first message.

10. A non-transitory computer readable medium comprising a computer program, which, when executed on a user device, causes the user device to:
store contacts in a data source;
receive a first request to view a contact list, wherein the contact list includes at least a subset of the stored contacts;
provide a list of contacts in response to the first request;
receive a second request to tag one or more contacts in the contact list;
automatically tag the one or more contacts—in response to the second request by querying a contact table;
receive a plurality of electronic messages, wherein at least one of the plurality of electronic messages is from a sender associated with a stored contact that is associated with a tag, wherein at least one of the plurality of electronic messages is from a sender associated with a stored contact that is not associated with a tag, wherein at least one of the plurality of electronic messages is from a sender that is not associated with a stored contact; and, for each received message:
- parse the received electronic message to obtain sender information;
- compare the obtained sender information to one or more of the stored contacts;
- when the comparison identifies a contact that is associated with the obtained sender information:
  - determine whether the identified contact is associated with a tag;
    - when the identified contact is associated with a tag:
      - position and prioritize the received message in the electronic message inbox such that the received message is displayed in the electronic message inbox with the stored associated tag wherein the electronic message inbox displays the received message sequentially with any other received message having had an identified contact associated with a tag as one single group and wherein the message includes a voicemail message from the tagged contact, thereby allowing the user to see when the tagged contact has left a voicemail;
    - when the identified contact is not associated with a tag:
      - positioning the received message in the electronic message inbox such that the received message is displayed below any electronic message received from a contact that is associated with a tag; and,
  - when the comparison does not identify a stored contact that is associated with the obtained sender information:
    - position the received message in the electronic message inbox such that the message is displayed below any electronic message received from a contact that is associated with a tag.

11. The medium according to claim 10, further causing the user device to combine the contacts into a display list box.

12. The medium according to claim 10, further causing the user device to display a tag status for each of the contacts.

13. The medium according to claim 10, further causing the user device to:
- determine whether a tag status has changed for the at least one contact; and
- store a new tag status for the at least one contact when the tag status has been determined to have changed.

* * * * *